United States Patent
Agarwal et al.

(10) Patent No.: US 12,425,875 B2
(45) Date of Patent: Sep. 23, 2025

(54) METHOD AND SYSTEM FOR BEAM ALIGNMENT IN WIRELESS NETWORK

(71) Applicant: SAMSUNG ELECTRONICS CO., LTD., Suwon-si (KR)

(72) Inventors: Rishav Agarwal, Bangalore (IN); Ankur Pooniya, Bangalore (IN); Koustav Roy, Bangalore (IN); Sripada Kadambar, Bangalore (IN); Chirodeep Paul, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 395 days.

(21) Appl. No.: 17/956,318

(22) Filed: Sep. 29, 2022

(65) Prior Publication Data

US 2023/0025445 A1 Jan. 26, 2023

Related U.S. Application Data

(63) Continuation of application No. PCT/KR2021/003657, filed on Mar. 24, 2021.

(30) Foreign Application Priority Data

Mar. 29, 2020 (IN) .............................. 202041013761
Mar. 17, 2021 (IN) ............................. 2020 41013761

(51) Int. Cl.
    *H04W 16/28* (2009.01)
(52) U.S. Cl.
    CPC .................................. *H04W 16/28* (2013.01)
(58) Field of Classification Search
    None
    See application file for complete search history.

(56) References Cited

U.S. PATENT DOCUMENTS 9,793,596 B2 * 10/2017 Hyde ................. H01Q 15/0086
10,285,015 B2 * 5/2019 Shirakata ................ H04L 67/52
(Continued)

FOREIGN PATENT DOCUMENTS

| EP | 3537625 A1 | 9/2019 |
|---|---|---|
| KR | 10-2016-0148032 A | 12/2016 |
| KR | 10-2018-0072402 A | 6/2018 |

OTHER PUBLICATIONS

International Search Report (PCT/ISA/210) issued Jun. 30, 2021 by the International Search Authority in International Application No. PCT/KR2021/003657.
(Continued)

*Primary Examiner* — Gregory B Sefcheck
(74) *Attorney, Agent, or Firm* — Sughrue Mion, PLLC

(57) ABSTRACT

The disclosure provides methods and apparatuses for performing beam alignment. In some embodiments, a method of performing beam alignment by a user equipment (UE) of a wireless network, includes determining, by the UE based on a plurality of parameters associated with the UE, a first quality level of a connection of the UE in a first orientation and at a geographical location. The connection uses a first beam from at least one network entity of the wireless network. The method further includes determining, by the UE based on the first quality level, a second orientation from a plurality of orientations at the geographical location. The second quality level of the second orientation exceeds the first quality level. The method further includes changing, by the UE, an orientation of the UE from the first orientation to the second orientation.

15 Claims, 11 Drawing Sheets

(56) References Cited

U.S. PATENT DOCUMENTS

| | | | |
|---|---|---|---|
| 11,026,071 B1* | 6/2021 | Files | H04B 7/0617 |
| 2003/0114196 A1* | 6/2003 | Chitrapu | H04W 16/28 |
| | | | 455/562.1 |
| 2003/0181163 A1* | 9/2003 | Ofuji | H04W 72/046 |
| | | | 455/25 |
| 2005/0070266 A1* | 3/2005 | Senarath | H04W 16/12 |
| | | | 455/422.1 |
| 2008/0084350 A1* | 4/2008 | Uno | H04W 76/10 |
| | | | 342/367 |
| 2010/0150364 A1* | 6/2010 | Buck | H04S 3/00 |
| | | | 381/92 |
| 2010/0302101 A1 | 12/2010 | Leiba et al. | |
| 2014/0213249 A1* | 7/2014 | Kang | H04W 64/003 |
| | | | 455/434 |
| 2014/0269414 A1* | 9/2014 | Hyde | H01Q 3/26 |
| | | | 370/254 |
| 2015/0031345 A1* | 1/2015 | Hyde | H04L 41/0803 |
| | | | 455/418 |
| 2015/0349863 A1 | 12/2015 | El Ayach et al. | |
| 2017/0303278 A1* | 10/2017 | Calin | H04B 7/022 |
| 2017/0318491 A1* | 11/2017 | Chen | H04B 7/0617 |
| 2018/0278309 A1* | 9/2018 | Raghavan | H04B 7/0617 |
| 2019/0058533 A1* | 2/2019 | Ghosh | H04B 17/3912 |
| 2019/0334607 A1 | 10/2019 | Kim | |
| 2020/0007209 A1 | 1/2020 | Kang | |
| 2020/0100290 A1* | 3/2020 | Mundarath | H04B 7/0695 |
| 2020/0358482 A1* | 11/2020 | Coldrey | H04B 7/0617 |
| 2020/0413267 A1* | 12/2020 | Xue | H04W 24/08 |
| 2021/0076451 A1* | 3/2021 | Nguyen | H04W 80/02 |
| 2021/0092702 A1* | 3/2021 | Kenington | H04B 7/06 |
| 2021/0227396 A1* | 7/2021 | Khalid | H04W 16/28 |
| 2021/0314917 A1* | 10/2021 | Lee | H04B 7/0404 |
| 2021/0409973 A1* | 12/2021 | Berggren | H04W 24/02 |
| 2022/0272711 A1* | 8/2022 | Syed Muhammad | |
| | | | H04L 5/0069 |
| 2022/0368393 A1* | 11/2022 | Lee | H04B 7/0634 |
| 2023/0008786 A1* | 1/2023 | Karjalainen | H04W 8/005 |
| 2023/0025445 A1* | 1/2023 | Agarwal | H04B 17/318 |
| 2023/0370148 A1* | 11/2023 | Hu | H04B 7/06952 |
| 2024/0040415 A1* | 2/2024 | Ashour | H04B 17/318 |
| 2024/0063885 A1* | 2/2024 | Ozkoc | H04B 7/088 |
| 2025/0071718 A1* | 2/2025 | Harrebek | G01S 5/0009 |

OTHER PUBLICATIONS

Written Opinion (PCT/ISA/237) issued Jun. 30, 2021 by the International Search Authority in International Application No. PCT/KR2021/003657.

Communication issued Feb. 14, 2022 by the Indian Patent Office in Indian Patent Application No. 202041013761.

* cited by examiner

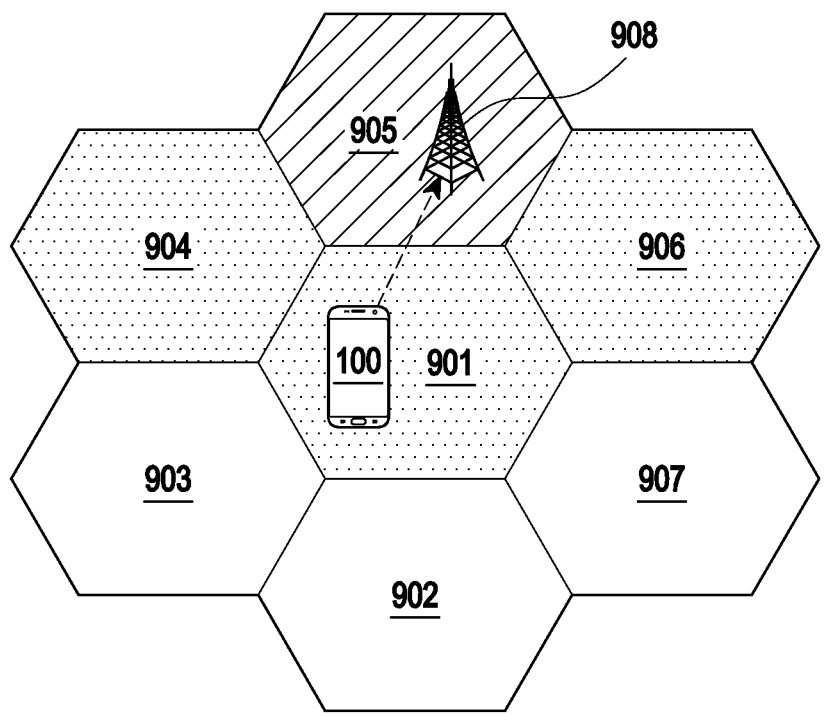
FIG.9C
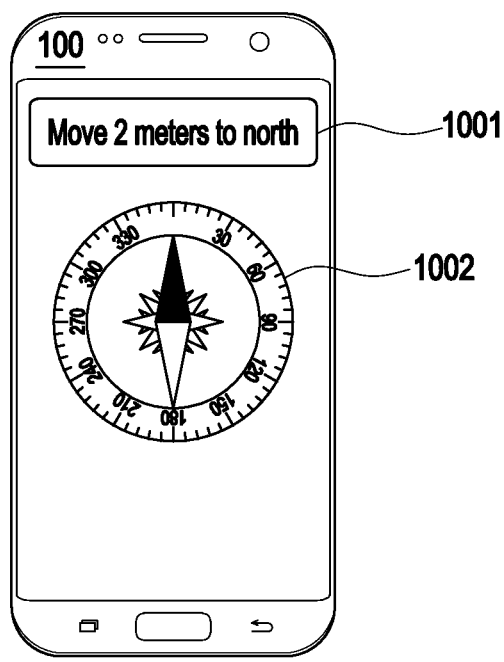 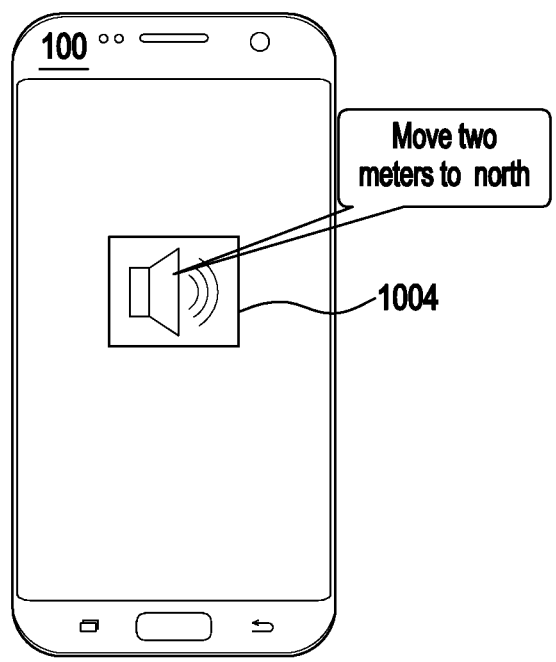
FIG.10A  FIG.10B

METHOD AND SYSTEM FOR BEAM ALIGNMENT IN WIRELESS NETWORK

CROSS-REFERENCE TO RELATED APPLICATIONS

This application is a continuation application of International Application No. PCT/KR2021/003657, filed on Mar. 24, 2021, which claims priority to Indian Patent Application 202041013761, filed on Mar. 17, 2021, and to Indian Provisional Patent Application 202041013761, filed on Mar. 29, 2020, in the Indian Patent Office, the disclosures of which are incorporated by reference herein in their entireties.

BACKGROUND

1. Field

The disclosure relates to wireless communication devices, and more specifically to a method and a system for beam alignment in a wireless network.

2. Description of Related Art

To meet the demand for wireless data traffic having increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency-shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A user equipment (UE) needs to be aligned properly with the mmWave beam to obtain best data rate. A user may hold the UE in any random orientations in real-world scenarios. But, an alignment of the UE with the mmWave beam rapidly varies with changes in orientation of the UE, which deteriorates data rate at the UE. Thus, it is desired to provide an alternative for aligning the UE properly with the mmWave bands.

SUMMARY

Embodiments disclosed herein provide methods and systems for beam alignment at a User Equipment (UE) in a wireless network. A connection quality of the UE may be optimal when the UE aligns with a beam of a network entity in the wireless network.

Embodiments disclosed herein provide for determining a second orientation for the UE for aligning to the beam of the network entity in response to detecting a poor connection quality in a first orientation of the UE with the beam of the network entity.

Embodiments disclosed herein provide for guiding the UE or a user to change an orientation of the UE from the first orientation to the second orientation for aligning the UE with the beam of the network entity. A data rate at the UE may improve in response to aligning the UE with the beam of the network entity in a correct direction and/or orientation.

According to an aspect of the disclosure, a method for beam alignment by a UE of a wireless network is provided. The method includes determining, by the UE based on a plurality of parameters associated with the UE, a first quality level of a connection of the UE in a first orientation and at a geographical location. The connection uses a first beam from at least one network entity of the wireless network. The method further includes determining, by the UE based on the first quality level, a second orientation from a plurality of orientations at the geographical location. A second quality level of the second orientation exceeds the first quality level. The method further includes changing, by the UE, an orientation of the UE from the first orientation to the second orientation.

In an example embodiment, the method may further include maintaining, by the UE, the connection with the at least one network entity while the orientation of the UE is changed from the first orientation to the second orientation, and performing, by the UE, communications with the at least one network entity in the second orientation at the geographical location.

In an example embodiment, the plurality of parameters may include at least one of a signal-to-noise ratio (SNR) of a beam received from the wireless network, signal-to-interference-plus-noise ratio (SINR) of the beam, a signal strength, a radio link failure frequency, a width of the beam, a beam identifier (ID), a sector ID, a public land mobile network (PLMN) ID, a physical cell ID, a reference signal received power (RSRP) of the beam, a reference signal received quality (RSRQ) of the beam, a longitude of the UE, a latitude of the UE, an azimuthal angle of the UE, a polar angle of the UE, and a height of the UE from a ground.

In an example embodiment, the UE may be connected to the at least one network entity using the first beam or another beam.

In an example embodiment, the determining of the second orientation may include estimating, by the UE based on the plurality of parameters, for each orientation of the plurality of orientations, a corresponding quality level of the connection at the geographical location. The determining of the second orientation may further include identifying, by the UE and using a machine learning (ML) model, the second orientation based on the corresponding quality level of the connection. The determining of the second orientation may further include determining, by the UE, that the corresponding quality level of the second orientation exceeds the first quality level.

In an example embodiment, the estimating of the corresponding quality level of the connection may include monitoring, by the UE based on the plurality of parameters, the corresponding quality level of the connection for each orientation of the plurality of orientations over a period of time. The estimating of the corresponding quality level of the connection may further include identifying, by the UE, geographical locations associated with the plurality of orientations of the UE. The estimating of the corresponding quality level of the connection may further include storing, by the UE in a database of the UE, information about the corresponding quality level of the connection and the geographical locations associated with the plurality of orientations.

In an example embodiment, the information about the corresponding quality level of the connection may include an upper confidence bound (UCB) value for each of the geographical locations associated with the plurality of orientations of the UE.

In an example embodiment, the identifying of the second orientation may include identifying, by the UE, the geographical location of the UE that establishes the connection with the at least one network entity in the first orientation. The identifying of the second orientation may further include determining, by the UE based on information about the first quality level of the connection stored in a database of the UE, a candidate geographical location having one or more network entities with a beam nearest to the geographical location of the UE. The identifying of the second orientation may further include determining, by the UE, the second orientation based on the candidate geographical location and the information about the first quality level of the connection.

In an example embodiment, the ML model may have been trained for identifying the second orientation by receiving one or more parameters corresponding to a particular beam; normalizing, based on the one or more parameters, a RSRP of the particular beam; determining, based on the normalized RSRP, an UCB value for a geographical location corresponding to the at least one network entity and the first orientation of the UE; storing the UCB value in a database of the UE; and updating, based on stored UCB values, a candidate geographical location having the at least one network entity with a beam and the second orientation.

According to an aspect of the disclosure, a method for beam alignment by a cloud server of a wireless network is provided. The method includes receiving, by the cloud server from a UE of the wireless network, a plurality of parameters associated with the UE. The method further includes determining, by the cloud server based on the plurality of parameters, a first quality level of a connection of the UE in a first orientation and at a geographical location. The connection uses a first beam from at least one network entity of the wireless network. The method further includes determining, by the cloud server based on the first quality level, a second orientation from a plurality of orientations at the geographical location. A second quality level of the second orientation exceeds the first quality level. The method further includes configuring, by the cloud server, the UE to change an orientation of the UE from the first orientation to the second orientation.

In an example embodiment, the plurality of parameters may include at least one of a SNR of a beam received from the wireless network, a SINR of the beam, a signal strength, a radio link failure frequency, a width of the beam, a beam ID, a sector ID, a PLMN ID, a physical cell ID, a RSRP of the beam, a RSRQ of the beam, a longitude of the UE, a latitude of the UE, an azimuthal angle of the UE, a polar angle of the UE, and a height of the UE from a ground.

In an example embodiment, the UE may be connected to the at least one network entity using the first beam or another beam.

In an example embodiment, the determining of the second orientation may include estimating, by the cloud server based on the plurality of parameters, for each orientation of the plurality of orientations, a corresponding quality level of the connection at the geographical location. The determining of the second orientation may further include identifying, by the cloud server and using a ML model, the second orientation based on the corresponding quality level of the connection. The determining of the second orientation may further include determining, by the cloud server, that the corresponding quality level of the second orientation exceeds the first quality level.

According to an aspect of the disclosure, an apparatus for performing beam alignment by a UE of a wireless network is provided. The apparatus includes a memory storing one or more instructions, and at least one processor communicatively coupled to the memory. The processor is configured to execute the one or more instructions stored in the memory to determine, based on a plurality of parameters associated with the UE, a first quality level of a connection of the UE in a first orientation and at a geographical location. The connection uses a first beam from at least one network entity of the wireless network. The processor is further configured to determine, based on the first quality level, a second orientation from a plurality of orientations at the geographical location. A second quality level of the second orientation exceeds the first quality level. The processor is further configured to change an orientation of the UE from the first orientation to the second orientation.

In an example embodiment, the processor may be further configured to maintain the connection with the at least one network entity while the orientation of the UE is changed from the first orientation to the second orientation, and to perform communications with the at least one network entity in the second orientation at the geographical location.

In an example embodiment, the processor may be further configured to estimate, based on the plurality of parameters, for each orientation of the plurality of orientations, a corresponding quality level of the connection at the geographical location. The processor may be further configured to identify, using a ML model, the second orientation based on the corresponding quality level of the connection. The processor may be further configured to determine that the corresponding quality level of the second orientation exceeds the first quality level.

In an example embodiment, the processor may be further configured to monitor, based on the plurality of parameters, the corresponding quality level of the connection for each orientation of the plurality of orientations over a period of time. The processor may be further configured to identify geographical locations associated with the plurality of orientations of the UE. The processor may be further configured to store, in a database of the UE, information about the corresponding quality level of the connection and the geographical locations associated with the plurality of orientations.

According to an aspect of the disclosure, an apparatus for performing beam alignment by a cloud server of a wireless network is provided. The apparatus includes a memory storing one or more instructions, and at least one processor communicatively coupled to the memory. The processor is configured to execute the one or more instructions stored in the memory to receive, from a UE of the wireless network, a plurality of parameters associated with the UE. The processor is further configured to determine, based on the plurality of parameters, a first quality level of a connection of the UE in a first orientation and at a geographical location.

The connection uses a first beam from at least one network entity of the wireless network. The processor is further configured to determine, based on the first quality level, a second orientation from a plurality of orientations at the geographical location. A second quality level of the second orientation exceeds the first quality level. The processor is further configured to configure the UE to change an orientation of the UE from the first orientation to the second orientation.

In an example embodiment, the plurality of parameters may include at least one of a SNR of a beam received from the wireless network, a SINR of the beam, a signal strength, a radio link failure frequency, a width of the beam, a beam ID, a sector ID, a PLMN ID, a physical cell ID, an RSRP of the beam, an RSRQ of the beam, a longitude of the UE, a latitude of the UE, an azimuthal angle of the UE, a polar angle of the UE, and a height of the UE from a ground.

In an example embodiment, the processor may be further configured to estimate, based on the plurality of parameters, for each orientation of the plurality of orientations, a corresponding quality level of the connection at the geographical location. The processor may be further configured to identify, using a ML model, the second orientation based on the corresponding quality level of the connection. The processor may be further configured to determine that the corresponding quality level of the second orientation exceeds the first quality level.

According to an aspect of the disclosure, a system for performing beam alignment in a wireless network is provided. The system includes the cloud server and the UE. The UE is configured to establish the connection with the network entity in the wireless network using first beam from the plurality of beams available at the UE, where the first beam is in the first orientation and in the geographical location of the wireless network. The UE is configured to send plurality of parameters associated with the UE to the cloud server. The UE cloud server is configured to determine the quality level of the connection associated with the first beam based on the plurality of parameters. The UE cloud server is configured to determine second orientation from the plurality of orientations in the geographical location based on the quality level of the connection associated with the first beam, where the connection quality associated with the second orientation provides the better connection compared to the quality level of the connection associated with the first beam in the first orientation. The UE cloud server is configured to automatically guide the UE to change the orientation of the UE from the first orientation to the second orientation.

These and other aspects of the embodiments herein will be better appreciated and understood when considered in conjunction with the following description and the accompanying drawings. It should be understood, however, that the following descriptions, while indicating exemplary embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method and system are illustrated in the accompanying drawings, throughout which like reference letters indicate corresponding parts in the various figures. The embodiments herein will be better understood from the following description with reference to the drawings, in which:

FIGS. 9A-9C illustrate an example scenario of guiding the user to change orientation of the UE from the first orientation to the second orientation, according to an embodiment as disclosed herein; and FIGS. 10A-10B illustrate a method of guiding the user to change orientation of the UE from the first orientation the second orientation, according to an embodiment as disclosed herein.

DETAILED DESCRIPTION

Figure 1:
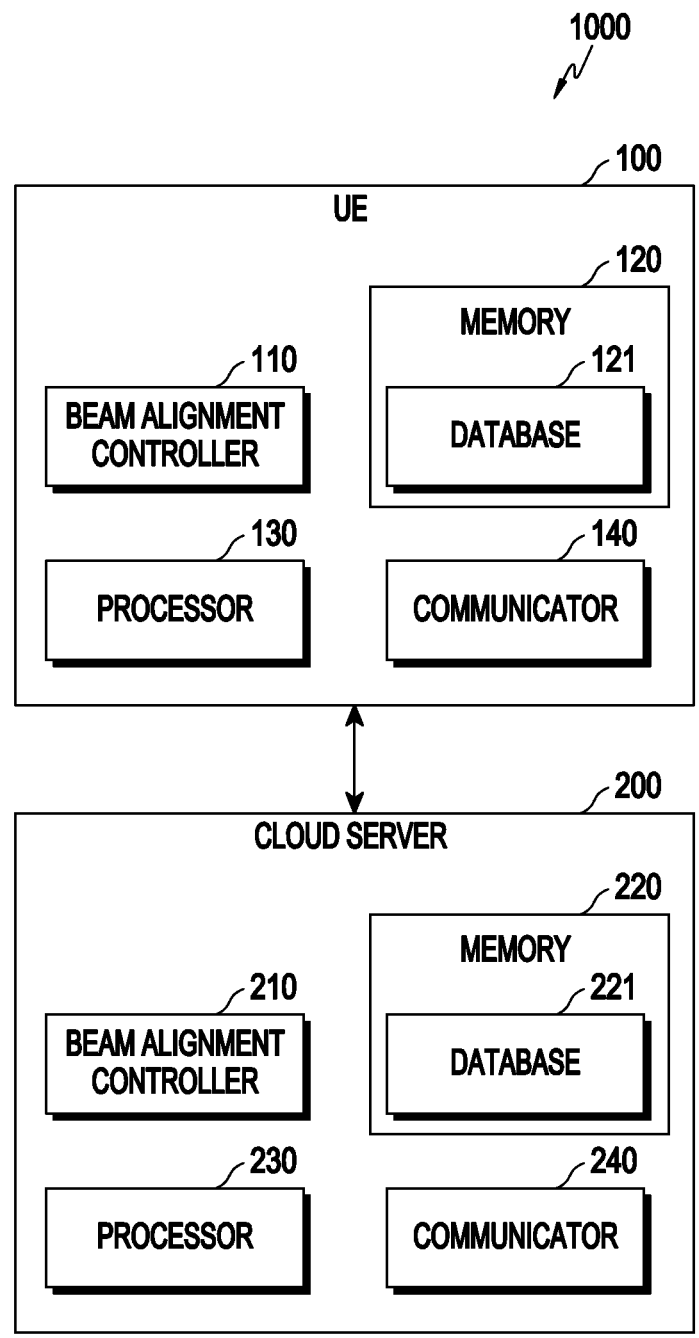
FIG. 1 is a block diagram of a system for beam alignment at a UE in a wireless network, according to an embodiment as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The embodiments disclosed herein provide a method for beam alignment at a UE in a wireless network. The method includes establishing, by the UE, a connection with a network entity in the wireless network using a first beam from beams available at the UE, where the first beam is in a first orientation and a geographical location of the wireless network. Further, the method includes determining, by the UE, a quality level of the connection associated with the first beam based on parameters associated with the UE. Further, the method includes determining, by the UE, a second orientation from orientations in the geographical location based on the quality level of the connection associated with the first beam, where a connection quality associated with the second orientation provides a better connection compared to the quality level of the connection associated with the first beam in the first orientation. Further, the method includes automatically guiding, by the UE, to change an orientation of the UE from the first orientation to the second orientation.

The embodiments disclosed herein provide a method for the beam alignment at the UE in the wireless network. The method includes establishing, by the UE, the connection with network entity in the wireless network using first beam from the beams available at the UE, where the first beam is in the first orientation and the geographical location of the wireless network. The method includes sending, by the UE, the parameters associated with the UE to the cloud server. The method includes determining, by the cloud server, the quality level of the connection associated with the first beam based on the parameters. The method includes determining, by the cloud server, second orientation from the orientations in the geographical location based on the quality level of the connection associated with the first beam, where the connection quality associated with the second orientation provides the better connection compared to the quality level of the connection associated with the first beam in the first orientation. The method includes automatically guiding, by the cloud server, the UE to change the orientation of the UE from the first orientation to the second orientation.

The embodiments disclosed herein provide a UE for beam alignment in the wireless network. The UE includes a beam alignment controller, a memory, at least one processor, where the beam alignment controller is coupled to the memory and the processor. The beam alignment controller is configured to establish the connection with network entity in the wireless network using first beam from the beams available at the UE, where the first beam is in the first orientation and the geographical location of the wireless network. The beam alignment controller is configured to determine the quality level of the connection associated with the first beam based on the parameters associated with the UE. The beam alignment controller is configured to determine second orientation from the orientations in the geographical location based on the quality level of the connection associated with the first beam, where the connection quality associated with the second orientation provides the better connection compared to the quality level of the connection associated with the first beam in the first orientation. The beam alignment controller is configured to automatically guide to change the orientation of the UE from the first orientation to the second orientation.

Accordingly, the embodiments disclosed herein provide a system for beam alignment the wireless network. The system includes the cloud server and the UE. The UE is configured to establish the connection with the network entity in the wireless network using first beam from the beams available at the UE, where the first beam is in the first orientation and in the geographical location of the wireless network. The UE is configured to send the parameters associated with the UE to the cloud server. The UE cloud server is configured to determine the quality level of the connection associated with the first beam based on the parameters. The UE cloud server is configured to determine second orientation from the orientations in the geographical location based on the quality level of the connection associated with the first beam, where the connection quality associated with the second orientation provides the better connection compared to the quality level of the connection associated with the first beam in the first orientation. The UE cloud server is configured to automatically guide the UE to change the orientation of the UE from the first orientation to the second orientation.

Unlike related methods and systems, the UE disclosed herein guides a user to change the orientation of the UE from the first orientation to the second orientation for aligning the UE with a beam of the network entity. Therefore, a connection quality of the UE will be optimal in response to aligning the UE with the beam of the network entity. Moreover, a data rate at the UE improves in response to aligning the UE with the beam of the network entity.

Unlike related methods and systems, the methods disclosed herein allow actuators connected the UE to automatically change the orientation of the UE from the first orientation to the second orientation for aligning the UE with the beam of the network entity. Therefore, the method reduces a manual intervention needed for changing the orientation of the UE, which improves a user experience.

Referring now to the drawings, and more particularly to FIGS. 1 through 10B, there are shown exemplary embodiments of the disclosure.

FIG. 1 is a block diagram of a system (1000) for beam alignment at a UE (100) in a wireless network, according to an embodiment as disclosed herein. In an embodiment, the system (1000) includes the UE (100) and a cloud server (200). An example of the wireless network is a cellular network, a Wireless Fidelity (Wi-Fi) network etc. The wireless network includes a network entity such as a base station (e.g., gNodeB), etc. In an embodiment, the UE connects to the cloud server (200) through the wireless network. Examples of the UE (100) include, but are not limited to a smart phone, a tablet computer, a Personal Digital Assistance (PDA), a desktop computer, an Internet of Things (IoT), a wearable device, a Customer Premises Equipment (CPE), etc. In an embodiment, the UE (100) includes a beam alignment controller (110), a memory (120), a processor (130), and a communicator (140). The memory (120) includes a Database (DB) (121). The beam alignment controller (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The beam alignment controller (110) is configured to establish a connection with the network entity in the wireless network using a first beam from beams available at the UE (100). The UE (100) receives the first beam in a first orientation of the UE (100). In an embodiment, the UE (100) receives the first beam from the network entity located in a geographical location of the wireless network. In an embodiment, the beams include transmit beams and receive beams. The transmit beams are beams transmitted by the UE (100) to the network entity, where the receive beams are beams received by the UE (100) from the network entity.

The beam alignment controller (110) is configured to determine a quality level of the connection associated with the first beam based on parameters associated with the UE (100). In an embodiment, the quality level of the connection signifies a data rate at the UE (100). In an embodiment, the parameters comprise a Signal-to-Noise Ratio (SNR) of a beam received from the wireless network, a Signal-to-Interference-plus-Noise Ratio (SINR) of the beam, a signal strength, a radio link failure frequency, a width of the beam, a beam Identifier (ID), a sector ID, a Public Land Mobile Network (PLMN) ID, a physical cell ID, a Reference Signal Received Power (RSRP) of the beam, a Reference Signal Received Quality (RSRQ) of the beam, a longitude of the UE (100), a latitude of the UE (100), an azimuthal angle of the UE (100), a polar angle of the UE (100), and a height of the UE (100) from ground.

In an embodiment, the beam alignment controller (110) is also configured to obtain the parameters from sensors and a modem of the UE (100) (not shown). The modem continually logs data related to beam parameters (e.g., RSSI, RSRP, RSRQ, SINR, etc.) upon establishing connection between the UE (100) and the network entity. The beam alignment controller (110) is configured to use the data related to the beam parameters along with geographical location coordinates (e.g., the longitude and the latitude) and rotational coordinates (e.g., the azimuthal angle, the polar angle, and the height) of UE (100) at an instant. The beam alignment controller (110) is configured to use the beam parameters for differentiating a geographical location of the network entity.

The beam alignment controller (110) is configured to determine a second orientation from orientations in the geographical location based on the quality level of the connection associated with the first beam. The connection quality associated with the second orientation provides a better connection (e.g., maximum data rate) compared to the quality level of the connection associated with the first beam in the first orientation. In an embodiment, a max mean square selection method (see FIG. 6) and a UCB based method (see FIG. 7) is used to determine the second orientation.

In an embodiment, the beam alignment controller (110) is configured to estimate the quality level of the connection between the UE (100) and the network entity in the geographical location for the orientations based on the parameters. In an embodiment, the beam alignment controller (110) is configured to monitor the quality level of the connection of the UE (100) with the network entity for the orientations of the UE (100) based on the parameters. Further, the beam alignment controller (110) is configured to identify geographical locations associated with the orientations of the UE (100). Further, the beam alignment controller (110) is configured to store information about the quality level of the connection corresponds to the orientations, and the geographical location associated with the orientations to the database (121) of the UE (100).

Figure 2A:
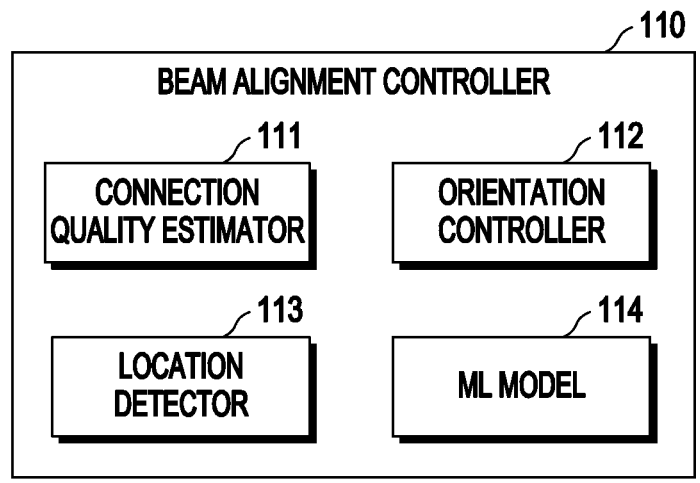
FIG. 2A is a block diagram of a beam alignment controller of the UE for automatically guiding to change an orientation of the UE from a first orientation to a second orientation, according to an embodiment as disclosed herein.

The beam alignment controller (110) is configured to identify the second orientation from the orientations at which the quality level of the connection of the UE (100) with the network entity is optimal using a ML model (114) (shown in FIG. 2A). In an embodiment, the beam alignment controller (110) is configured to identify the geographical location of the UE (100) that establishes the connection with the network entity in the first orientation. In an embodiment, the beam alignment controller (110) is configured to use data from a location sensor (e.g., Global Positioning System (GPS) sensor) and an orientation sensor (e.g., proximity sensor) of the UE (100) to determine the geographical location coordinates and the rotational coordinates of the UE (100) respectively. The beam alignment controller (110) is configured to determine a candidate geographical location of the network entity with an optimal beam nearest to the geographical location of the UE (100) based on information about the quality level of the connection stored in the database (121) of the UE (100).

The optimal beam is the beam which provides the maximum data rate to the UE (100). In an embodiment, the beam alignment controller (110) is configured to determine the second orientation based on the candidate geographical location and the information about the quality level of the connection stored in the database (121). The beam alignment controller (110) is configured to determine that the quality level of the connection of the UE (100) in the second orientation is better than the connection quality of the UE (100) in the first orientation. In an embodiment, the information about the quality level of the connection includes a UCB value for the geographical location of the network entity and an orientation of the UE (100).

In an embodiment, the beam alignment controller (110) is configured to train the ML model (114) for identifying the second orientation by receiving the parameters corresponds to the beam from the UE (100). Further, the beam alignment controller (110) is configured to normalize the RSRP of the beam in the parameters. Further, the beam alignment controller (110) is configured to determine the UCB value for the geographical location of the network entity and the orientation of the UE (100) based on the normalized RSRP of the beam. Further, the beam alignment controller (110) is configured to store the UCB value to the database (121) of the UE (100). Further, the beam alignment controller (110) is configured to update the candidate geographical location of the network entity with the optimal beam and the second orientation based on the stored UCB values.

The beam alignment controller (110) is configured to automatically guide to change the orientation of the UE (100) from the first orientation to the second orientation. In an embodiment, the beam alignment controller (110) is configured to generate output parameters for guiding the UE (100). In an embodiment, the output parameters include geolocation parameters (e.g., longitude and latitude) of the candidate geolocation of the network entity which provides the optimal beam and orientation parameters (e.g., azimuthal angle, polar angle, height) of the second orientation.

The beam alignment controller (110) is configured to change the orientation of the UE (100) from the first orientation to the second orientation based on the output parameters, while maintaining the connection with the network entity in the wireless network. In an embodiment, the beam alignment controller (110) is configured to provide the inputs to actuators of the UE (100), where the actuator changes the orientation of the UE (100) from the first orientation to the second orientation based on the inputs. In another embodiment, the beam alignment controller (110) is configured to provide inputs to an actuator mechanism that holds the UE (100), where the actuator mechanism changes the orientation of the UE (100) from the first orientation to the second orientation based on the inputs. In another embodiment, the beam alignment controller (110) is configured to provide audio or visual instructions to a user, where the user may manually change the orientation of the UE (100) based on the audio or visual instructions to obtain the maximum data rate at the UE (100). The beam alignment controller (110) is configured to communicate with the network entity in the wireless network in the second orientation in the geographical location of the wireless network.

In an embodiment, the cloud server (200) includes a beam alignment controller (210), a memory (220), a processor (230), and a communicator (240), where the memory (220) includes a database (221). The beam alignment controller (210) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

In another embodiment, the beam alignment controller (110) is configured to send the parameters to the cloud server (200), in response to establishing the connection between the UE (100) and the network entity using the first beam. The beam alignment controller (210) is configured to receive the parameters from the UE (100). Further, the beam alignment controller (210) is configured to determine the quality level of the connection associated with the first beam based on the parameters associated with the UE (100).

The beam alignment controller (210) is configured to use the data related to the beam parameters along with the geographical location coordinates of UE (100) at an instant. The beam alignment controller (210) is configured to use the beam parameters for differentiating the geographical location of the network entity. The beam alignment controller (210) is configured to determine the second orientation from the orientations in the geographical location based on the quality level of the connection associated with the first beam.

In an embodiment, the beam alignment controller (210) is configured to estimate the quality level of the connection between the UE (100) and the network entity in the geographical location for the orientations based on the parameters. In an embodiment, the beam alignment controller (210) is configured to monitor the quality level of the connection of the UE (100) with the network entity for the orientations based on the UE (100) based on the parameters. Further, the beam alignment controller (210) is configured to identify the geographical locations associated with the orientations of the UE (100). Further, the beam alignment controller (210) is configured to store the information about the quality level of the connection corresponds to the orientations and the geographical location associated with the orientations to the database (221).

Figure 2B:
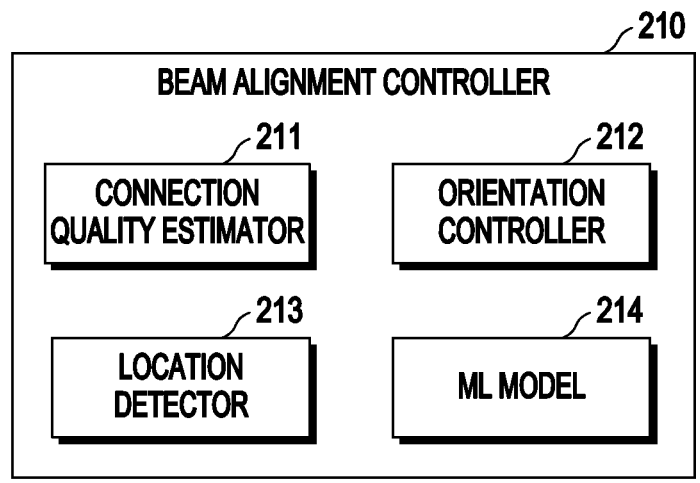
FIG. 2B is a block diagram of a beam alignment controller of a cloud server for automatically guiding the UE to change the orientation of the UE from the first orientation to the second orientation, according to an embodiment as disclosed herein.

The beam alignment controller (210) is configured to identify the second orientation from the orientations at which the quality level of the connection of the UE (100) with the network entity is optimal using the ML model (214) (shown in FIG. 2B). In an embodiment, the beam alignment controller (210) is configured to identify the geographical location of the UE (100) that establishes the connection with the network entity in the first orientation. In an embodiment, the beam alignment controller (210) is configured to use the data from the location sensor and the orientation sensor of the UE (100) to determine the geographical location coordinates and the rotational coordinates of the UE (100) respectively.

The beam alignment controller (210) is configured to determine the candidate geographical location of network entity with the optimal beam nearest to the geographical location of the UE (100) based on the information about the quality level of the connection stored in the database (221). In an embodiment, the beam alignment controller (210) is configured to determine the second orientation based on the candidate geographical location and the information about the quality level of the connection stored in the database (221). The beam alignment controller (210) is configured to determine that the quality level of the connection of the UE (100) in the second orientation is better than the connection quality of the UE (100) in the first orientation. In an embodiment, the beam alignment controller (210) is configured to train the ML model (214) for identifying the second orientation by receiving the parameters corresponds to the beam from the UE (100).

Further, the beam alignment controller (210) is configured to normalize the RSRP of the beam in the parameters. Further, the beam alignment controller (210) is configured to determine the UCB value for the geographical location of the network entity and the orientation of the UE (100) based on the normalized RSRP of the beam. Further, the beam alignment controller (210) is configured to store the UCB value to the database (221). Further, the beam alignment controller (210) is configured to update the candidate geographical location of the network entity with the optimal beam and the second orientation based on the stored UCB values. The beam alignment controller (210) is configured to automatically guide the UE (100) to change the orientation of the UE (100) from the first orientation to the second orientation. In an embodiment, the beam alignment controller (210) is configured to generate the output parameters and provide the output parameters to the UE (100) for guiding the UE (100). Further, the beam alignment controller (110) is configured to change the orientation of the UE (100) from the first orientation to the second orientation based on the output parameters while maintaining the connection with the network entity in the wireless network.

The memory (120, 220) store the parameters. The memory (120, 220) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM). In addition, the memory (120, 220) may, in some examples, be considered a non-transitory storage medium. The term "non-transitory" may indicate that the storage medium is not embodied in a carrier wave or a propagated signal. However, the term "non-transitory"

should not be interpreted that the memory (120, 220) is non-movable. In some examples, the memory (120, 220) may be configured to store larger amounts of information than the memory (120, 220) respectively. In certain examples, a non-transitory storage medium may store data that can, over time, change (e.g., in Random Access Memory (RAM) or cache).

The processor (130) is configured to execute instructions stored in the memory (120). The processor (230) is configured to execute instructions stored in the memory (220). The processor (130, 230) may include one or more processors. At this time, one or more processors may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). The processor (130, 230) may include multiple cores to execute the instructions.

The communicator (140) is configured to communicate internally between hardware components in the UE (100). The communicator (240) is configured to communicate internally between hardware components in the cloud server (200). The communicator (140, 240) is configured to facilitate the communication between the UE (100) and the cloud server (200) through the wireless network. The communicator (140, 240) includes an electronic circuit specific to a standard that enables wired or wireless communication.

At least one of the modules may be implemented through the ML model (114, 214). A function associated with ML model (114, 214) may be performed through the memory (120), and the processor (130).

In an embodiment, the one or a processors control processing of the input data in accordance with a predefined operating rule or ML model (114, 214) stored in the memory (120). The predefined operating rule or ML model (114, 214) is provided through training or learning.

Here, being provided through learning means that, by applying a learning technique to a learning data, a predefined operating rule or ML model (114, 214) of a desired characteristic is made. The learning may be performed in the UE (100) or the cloud server (200) itself in which the ML according to an embodiment is performed, and/or may be implemented through a separate server/system. The learning method is a method for training a predetermined target device (for example, a robot, the UE (100) or the cloud server (200) using a learning data to cause, allow, or control the target device to make a determination or prediction. Examples of learning methods include, but are not limited to, supervised learning, unsupervised learning, semi-supervised learning, or reinforcement learning.

The ML model (114, 214) may consist of a neural network layers. Each layer has a weight values, and performs a layer operation through calculation of a previous layer and an operation of a weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Although the FIG. 1 shows the hardware components of the UE (100) but it is to be understood that other embodiments are not limited thereon. In other embodiments, the UE (100) may include less or more number of components. Further, the labels or names of the components are used only for illustrative purpose and does not limit the scope of the invention. One or more components may be combined together to perform same or substantially similar function for the beam alignment at the UE (100).

FIG. 2A is a block diagram of the beam alignment controller (110) of the UE (100) for automatically guiding to change the orientation of the UE (100) from the first orientation to the second orientation, according to an embodiment as disclosed herein. In an embodiment, the beam alignment controller (110) includes a connection quality estimator (111), an orientation controller (112), a location detector (113), and the ML model (114). The connection quality estimator (111), the orientation controller (112), the location detector (113), and the ML model (114) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The connection quality estimator (111) establishes the connection with the network entity in the wireless network using the first beam from the beams available at the UE (100). The connection quality estimator (111) sends the parameters to the cloud server (200), in response to establishing the connection between the UE (100) and the network entity using the first beam. The connection quality estimator (111) determines the quality level of the connection associated with the first beam based on the parameters associated with the UE (100). In an embodiment, the connection quality estimator (111) obtains the parameters from the sensors and the modem of the UE (100). The connection quality estimator (111) uses the data related to the beam parameters along with geographical location coordinates (e.g., the longitude and the latitude) and rotational coordinates (e.g., the azimuthal angle, the polar angle, and the height) of UE (100) at an instant. The connection quality estimator (111) uses the beam parameters for differentiating the geographical location of the network entity.

The orientation controller (112) determines the second orientation from the orientations in the geographical location based on the quality level of the connection associated with the first beam.

In an embodiment, the orientation controller (112) estimates the quality level of the connection between the UE (100) and the network entity in the geographical location for the orientations based on the parameters. In an embodiment, the orientation controller (112) monitors the quality level of the connection of the UE (100) with the network entity for the orientations of the UE (100) based on the parameters. Further, the orientation controller (112) stores the information about the quality level of the connection corresponds to the orientations to the database (121). The location detector (113) identifies the geographical locations associated with the orientations of the UE (100). Further, the location detector (113) stores the information about the geographical location associated with the orientations to the database (121).

The orientation controller (112) identifies the second orientation from the orientations at which the quality level of the connection of the UE (100) with the network entity is optimal using the ML model (114) (shown in FIG. 2A). In an embodiment, the location detector (113) identifies the geographical location of the UE (100) that establishes the connection with the network entity in the first orientation. In an embodiment, the location detector (113) uses the data from the location sensor and an orientation sensor of the UE (100) to determine the geographical location coordinates and the rotational coordinates of the UE (100) respectively. The location detector (113) determines the candidate geographical location of the network entity with the optimal beam nearest to the geographical location of the UE (100) based on the information about the quality level of the connection stored in the database (121) of the UE (100). In an embodiment, the orientation controller (112) determines the second orientation based on the candidate geographical location and the information about the quality level of the connection stored in the database (121).

The orientation controller (112) determines that the quality level of the connection of the UE (100) in the second orientation is better than the connection quality of the UE (100) in the first orientation. In an embodiment, the orientation controller (112) trains the ML model (114) for identifying the second orientation by receiving the parameters corresponds to the beam from the UE (100). Further, the orientation controller (112) normalizes the RSRP of the beam in the parameters. Further, the orientation controller (112) determines the UCB value for the geographical location of the network entity and the orientation of the UE (100) based on the normalized RSRP of the beam. Further, the orientation controller (112) stores the UCB value to the database (121). Further, the orientation controller (112) updates the candidate geographical location of the network entity with the optimal beam and the second orientation based on the stored UCB values. The orientation controller (112) automatically guides to change the orientation of the UE (100) from the first orientation to the second orientation. In an embodiment, the orientation controller (112) generates the output parameters for guiding the UE (100).

The orientation controller (112) changes the orientation of the UE (100) from the first orientation to the second orientation based on the output parameters, while maintaining the connection with the network entity in the wireless network. In an embodiment, the orientation controller (112) provides the inputs to the actuators of the UE (100), where the actuator changes the orientation of the UE (100) from the first orientation to the second orientation based on the inputs. In another embodiment, the orientation controller (112) provides the inputs to the actuator mechanism that holds the UE (100), where the actuator mechanism changes the orientation of the UE (100) from the first orientation to the second orientation based on the inputs. In another embodiment, the orientation controller (112) provides the audio or visual instructions to the user, where the user may manually change the orientation of the UE (100) based on the audio or visual instructions to obtain the maximum data rate at the UE (100). The connection quality estimator (111) communicates with the network entity in the wireless network in the second orientation in the geographical location of the wireless network.

Although the FIG. 2A shows the hardware components of the beam alignment controller (110) but it is to be understood that other embodiments are not limited thereon. In other embodiments, the beam alignment controller (110) may include less or more number of components. Further, the labels or names of the components are used only for illustrative purpose and does not limit the scope of the invention. One or more components may be combined together to perform same or substantially similar function for automatically guiding to change the orientation of the UE (100) from the first orientation to the second orientation.

FIG. 2B is a block diagram of the beam alignment controller (210) of the cloud server (200) for automatically guiding to change the orientation of the UE (100) from the first orientation to the second orientation, according to an embodiment as disclosed herein. In an embodiment, the beam alignment controller (210) includes a connection quality estimator (211), an orientation controller (212), a location detector (213), and the ML model (214). The connection quality estimator (211), the orientation controller (212), the location detector (213), and the ML model (214) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The connection quality estimator (211) receive the parameters from the UE (100). Further, the connection quality estimator (211) determines the quality level of the connection associated with the first beam based on the parameters associated with the UE (100). The connection quality estimator (211) uses the data related to the beam parameters along with the geographical location coordinates of UE (100) at an instant. The connection quality estimator (211) uses the beam parameters for differentiating the geographical location of the network entity. The orientation controller (212) determines the second orientation from the orientations in the geographical location based on the quality level of the connection associated with the first beam.

In an embodiment, the orientation controller (212) estimates the quality level of the connection between the UE (100) and the network entity in the geographical location for the orientations based on the parameters. In an embodiment, the orientation controller (212) monitors the quality level of the connection of the UE (100) with the network entity for the orientations of the UE (100) based on the parameters. Further, the orientation controller (212) stores the information about the quality level of the connection corresponds to the orientations to the database (221). Further, the location detector (213) identifies the geographical locations associated with the orientations of the UE (100). Further, the location detector (213) stores the information about the geographical location associated with the orientations to the database (221).

The orientation controller (212) identifies the second orientation from the orientations at which the quality level of the connection of the UE (100) with the network entity is optimal using the ML model (214) (shown in FIG. 2B). In an embodiment, the location detector (213) identifies the geographical location of the UE (100) that establishes the connection with the network entity in the first orientation. In an embodiment, the location detector (213) uses the data from the location sensor and the orientation sensor of the UE (100) to determine the geographical location coordinates and the rotational coordinates of the UE (100) respectively. The orientation controller (212) determines the candidate geographical location of network entity with the optimal beam nearest to the geographical location of the UE (100) based on the information about the quality level of the connection stored in the database (221). In an embodiment, the orientation controller (212) determines the second orientation based on the candidate geographical location and the information about the quality level of the connection stored in the database (221).

The orientation controller (212) determines that the quality level of the connection of the UE (100) in the second orientation is better than the connection quality of the UE (100) in the first orientation. In an embodiment, the orientation controller (212) trains the ML model (214) for identifying the second orientation by receiving the parameters corresponds to the beam from the UE (100). Further, the orientation controller (212) normalizes the RSRP of the beam in the parameters. Further, the orientation controller (212) determines the UCB value for the geographical location of the network entity and the orientation of the UE (100) based on the normalized RSRP of the beam. Further, the orientation controller (212) stores the UCB value to the database (221). Further, the orientation controller (212) updates the candidate geographical location of the network entity with the optimal beam and the second orientation based on the stored UCB values. The orientation controller (212) automatically guides the UE (100) to change the orientation of the UE (100) from the first orientation to the second orientation. In an embodiment, the orientation controller (212) generates the output parameters and provides the output parameters to the UE (100) for guiding the UE (100).

Although the FIG. 2B shows the hardware components of the beam alignment controller (210) but it is to be understood that other embodiments are not limited thereon. In other embodiments, the beam alignment controller (210) may include less or more number of components. Further, the labels or names of the components are used only for illustrative purpose and does not limit the scope of the invention. One or more components may be combined together to perform same or substantially similar function for automatically guiding to change the orientation of the UE (100) from the first orientation to the second orientation.

Figure 3A:
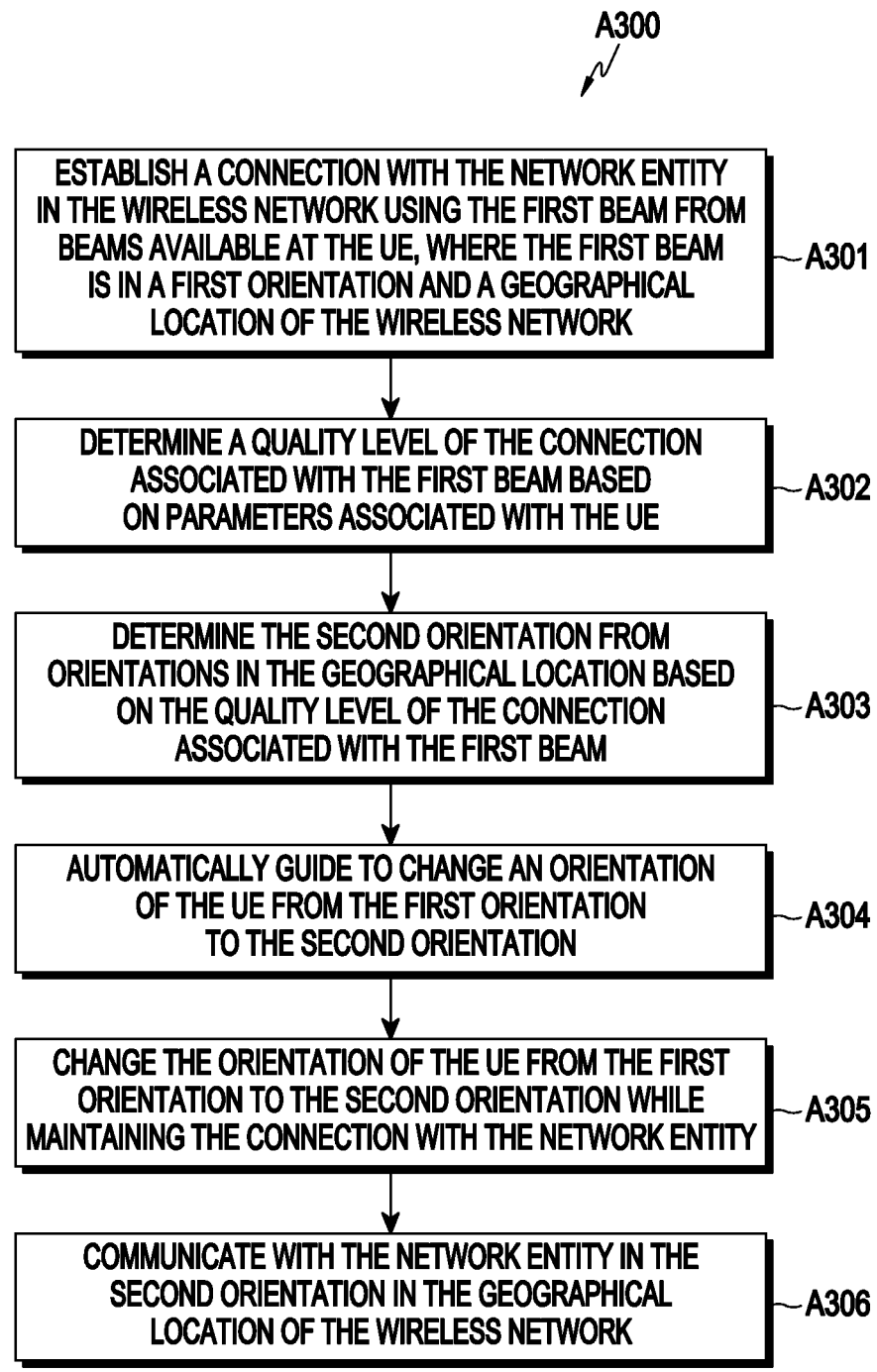
FIG. 3A is a flow diagram illustrating an on-device based method for the beam alignment at the UE, according to an embodiment as disclosed herein.

FIG. 3A is a flow diagram A300 illustrating an on-device based method for the beam alignment at the UE (100), according to an embodiment as disclosed herein. At A301, the method includes establishing the connection with the network entity in the wireless network using the first beam from the beams available at the UE (100), where the first beam is in the first orientation and the geographical location of the wireless network. In an embodiment, the method allows the connection quality estimator (111) to establish the connection with the network entity in the wireless network using the first beam from the beams available at the UE (100), where the first beam is in the first orientation and the geographical location of the wireless network. At A302, the method includes determining the quality level of the connection associated with the first beam based on the parameters associated with the UE (100). In an embodiment, the method allows the connection quality estimator (111) to determine the quality level of the connection associated with the first beam based on the parameters associated with the UE (100).

At A303, the method includes determining the second orientation from the orientations in the geographical location based on the quality level of the connection associated with the first beam. In an embodiment, the method allows the orientation controller (112) to determine the second orientation from the orientations in the geographical location based on the quality level of the connection associated with the first beam. At A304, the method includes automatically guiding to change the orientation of the UE (100) from the first orientation to the second orientation. In an embodiment, the method allows the orientation controller (112) to automatically guide to change the orientation of the UE (100) from the first orientation to the second orientation. At A305, the method includes changing the orientation of the UE (100) from the first orientation to the second orientation while maintaining the connection with the network entity. In an embodiment, the method allows the orientation controller (112) to change the orientation of the UE (100) from the first orientation to the second orientation while maintaining the connection with the network entity. At A306, the method includes communicating with the network entity in the second orientation in the geographical location of the wireless network. In an embodiment, the method allows the connection quality estimator (111) to communicate with the network entity in the second orientation in the geographical location of the wireless network.

The various actions, acts, blocks, steps, or the like in the flow diagram 300 may be performed in the order presented, in a different order or simultaneously. Further, in some embodiments, some of the actions, acts, blocks, steps, or the like may be omitted, added, modified, skipped, or the like without departing from the scope of the invention.

Figure 3B:
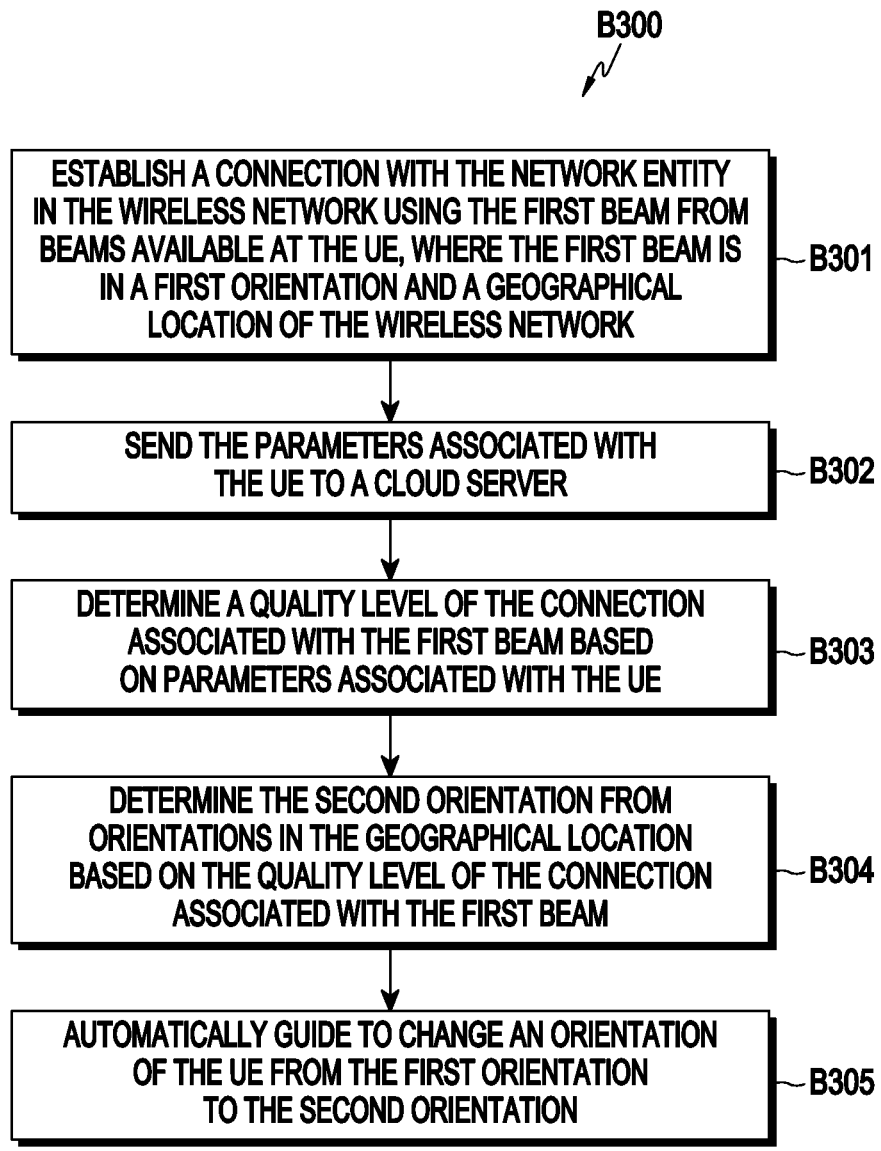
FIG. 3B is a flow diagram illustrating a cloud server based method for the beam alignment at the UE, according to an embodiment as disclosed herein.

FIG. 3B is a flow diagram B300 illustrating a cloud server based method for the beam alignment at the UE (100), according to an embodiment as disclosed herein. At B301, the method includes establishing the connection with the network entity in the wireless network using the first beam from the beams available at the UE (100), where the first beam is in the first orientation and the geographical location of the wireless network. In an embodiment, the method allows the connection quality estimator (111) to establish the connection with the network entity in the wireless network using the first beam from the beams available at the UE (100), where the first beam is in the first orientation and the geographical location of the wireless network. At B302, the method includes sending the parameters associated with the UE (100) to the cloud server (200). In an embodiment, the method allows the connection quality estimator (111) to send the parameters associated with the UE (100) to the cloud server (200).

At B303, the method includes determining the quality level of the connection associated with the first beam based on the parameters associated with the UE (100). In an embodiment, the method allows the connection quality estimator (211) to determine the quality level of the connection associated with the first beam based on the parameters associated with the UE (100). At B304, the method includes determining the second orientation from the orientations in the geographical location based on the quality level of the connection associated with the first beam. In an embodiment, the method allows the orientation controller (212) to determine the second orientation from the orientations in the geographical location based on the quality level of the connection associated with the first beam. At B305, the method includes automatically guiding to change the orientation of the UE (100) from the first orientation to the second orientation. In an embodiment, the method allows the orientation controller (212) to automatically guide to change the orientation of the UE (100) from the first orientation to the second orientation.

The various actions, acts, blocks, steps, or the like in the flow diagram B300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
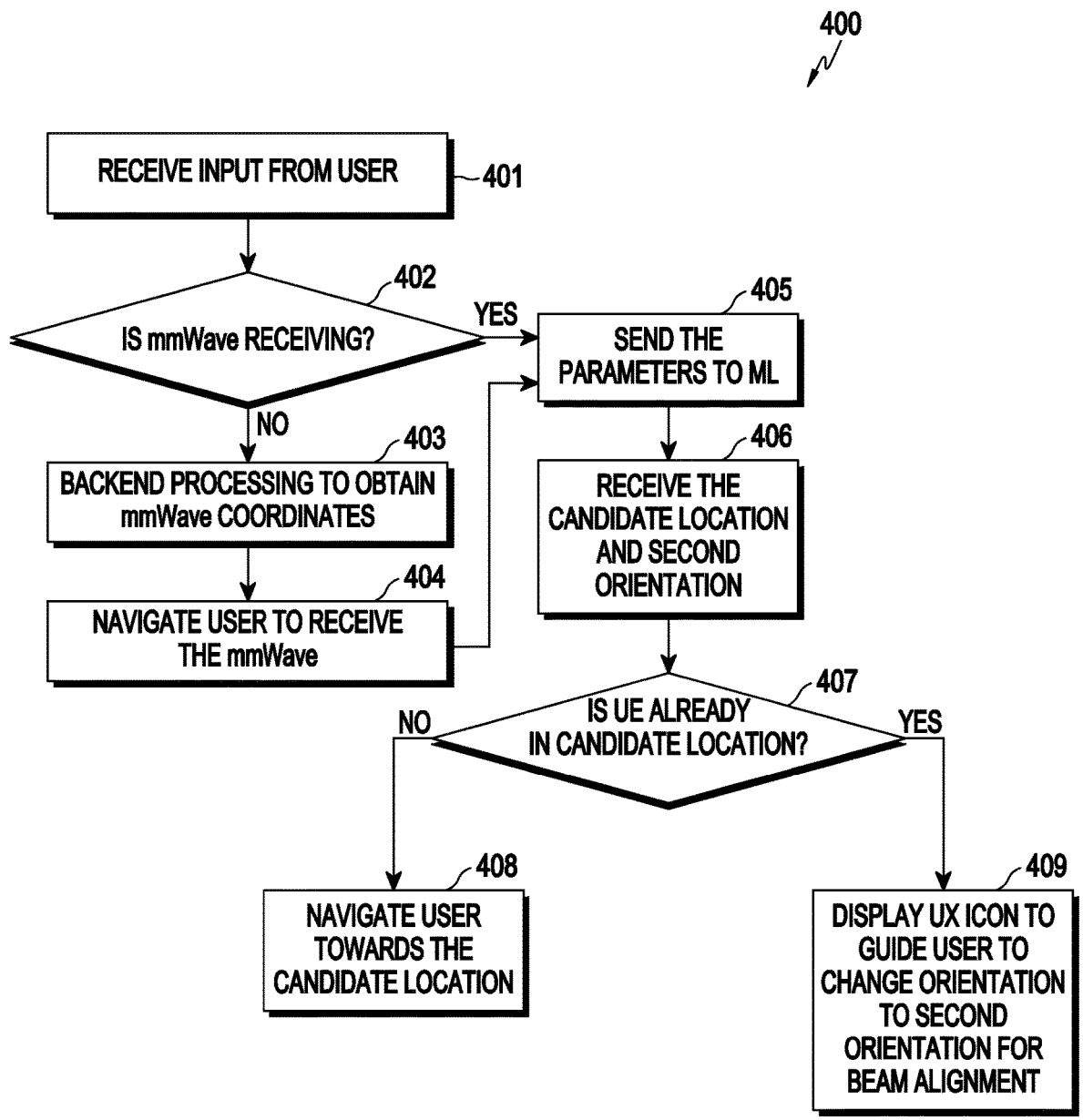
FIG. 4 is a flow diagram illustrating a method of guiding a user by the UE in an example scenario, according to an embodiment as disclosed herein.

FIG. 4 is a flow diagram 400 illustrating a method of guiding the user by the UE (100) in an example scenario, according to an embodiment as disclosed herein. In an embodiment, method allows the beam alignment controller 110 of the UE (100) to perform steps 401-409. At 401, the method includes receiving an input from the user for the beam alignment. At 402, the method includes checking whether the UE (100) is receiving a mmWave beam from the network entity. At 403, the method includes performing backend steps to obtain mmWave coordinates of a nearby network entity upon detecting that the UE (100) is not receiving the mmWave beam. In an embodiment, the mmWave coordinates are obtained from the cloud server (200) or from a connection logs of the UE (100). At 404, the method includes navigating the user to a location corresponds to the mmWave coordinates for receiving the mmWave beam at the UE (100). At 405, the method includes sending the parameters to the ML model (114) upon receiving the mmWave beam from the network entity. At 406, the method includes receiving the information about the candidate location and the second orientation for the beam alignment from the ML model (114). At 407, the method includes determining whether the current location of the UE (100) is the candidate location based on the information about the candidate location. At 407, the method includes displaying a User Experience (UX) icon (e.g., compass icon) to guide the user for changing the current orientation (e.g., first orientation) of the UE (100) to the second orientation for the beam alignment, upon detecting that the current location of the UE (100) is the candidate location. At 408, the method includes navigating the user towards the candidate location from the current location, upon detecting that the current location of the UE (100) is not the candidate location. Further, the method includes performing step 409, in response to reaching UE (100) at the candidate location.

The various actions, acts, blocks, steps, or the like in the flow diagram 400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
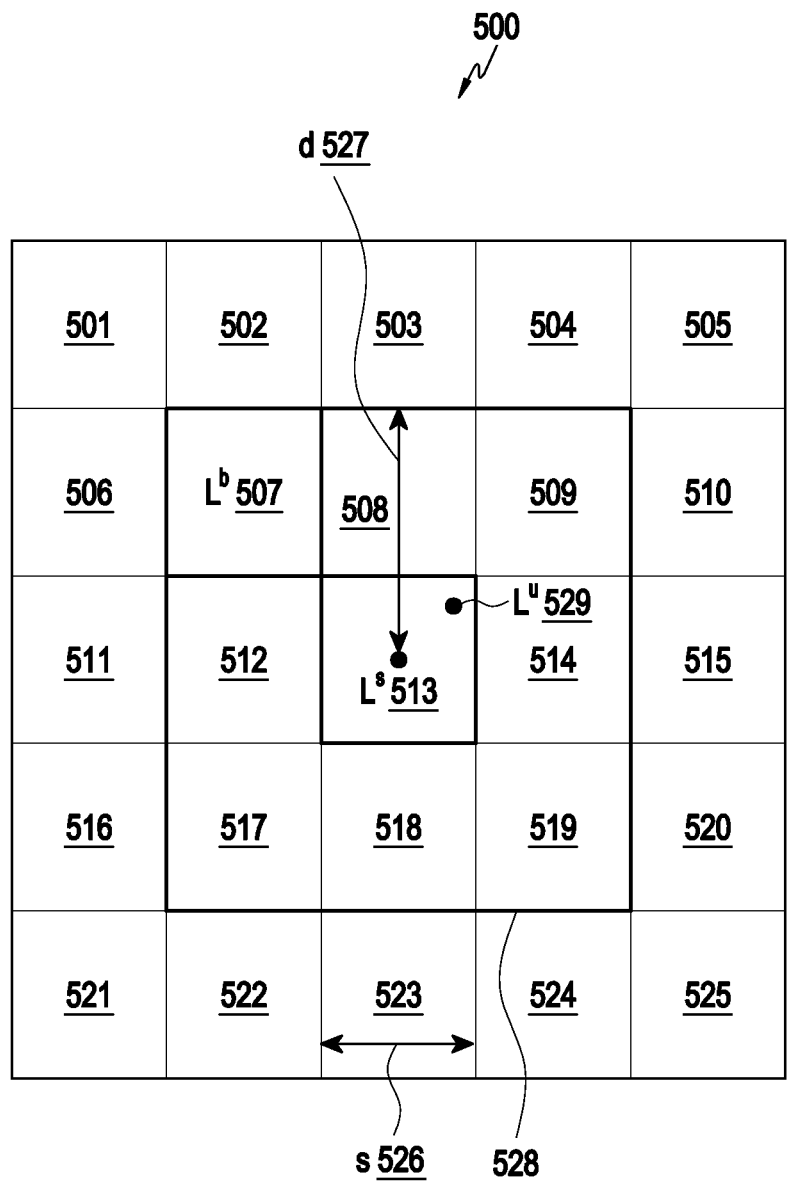
FIG. 5 illustrate a schematic representation of dividing geographical location into multiple smaller square blocks, according to an embodiment as disclosed herein.

FIG. 5 illustrates a schematic representation of dividing the geographical location into multiple smaller square blocks (501-525), according to an embodiment as disclosed herein. A square block (500) represents the geographical location includes the location $L^u$ (529) of the UE (100). The UE (100) divides the square block (500) into the multiple smaller square blocks (501-525), where a length of each side of the smaller square block (501-525) is s (526). A value of s (526) is selected such that the RSRP, the RSRQ, the RSSI, the SINR and a UE performance will not deviate in each smaller square block (501-525). The UE (100) selects the portion (528) from the square block (500) includes nine smaller square blocks. The nine smaller square blocks include the smaller square block (513) includes the location $L^u$ (529) of the UE (100) and eight smaller square blocks (507, 508, 509, 512, 514, 517, 518, 519) that arranged outside the smaller square block (513). $L^s$ represents the location of the small square block (513) contains the UE (100). d (527) is a search distance (e.g., adjacency distance). For example, if d=1, then the square blocks (507, 508, 509, 512, 514, 517, 518, 519) which are adjacent to the location of the UE (100) should be considered. When d=2, then the square blocks (507, 508, 509, 512, 514, 517, 518, 519) which are adjacent to the location of the UE (100) and the square blocks (501, 502, 503, 504, 505, 506, 510, 511, 515, 516, 520, 521, 522, 523, 524, 525) which are adjacent to the square blocks (507, 508, 509, 512, 514, 517, 518, 519) adjacent to the UE (100). Consider, the small square block (507) is the candidate location where the quality of the beam of maximum in the location represents the small square block (507). Then, $L^b$ (507) a best smaller square block that represents the candidate location. Consider, $g^a$ is a GPS accuracy, then s≥$g^a$. Also, the orientation, O=[$N^o$]=8→Octant-wise orientation. (DB.S, DB.O)⇒DB.RSRP[DB.S, DB.O]. DB represents the database (121). DB.S represents coordinate of the square block as stored in the database (121). DB.O represents a best orientation at the square block capable of yielding best connection (e.g., best RSRP) as stored in the database (121). DB.mean(s) represents mean of a signal strength indicator (e.g., RSRP). DB.var(s) represents variance of the signal strength indicator. DB.UCB(s) represents UCB of the signal strength indicator calculated as per the value of d. Var$_{threshold}$ represents a threshold variance. UCB$_{threshold}$ represents a threshold upper confidence bound.

The UCB value may be determined using equation 1 or equation 2.

$$UCB^s = \frac{\sum_{k=1}^n R_k^s}{n} + \sqrt{2(\log(n))} \quad \text{(equation 1)}$$

where R represents the signal strength indicator, $$UCB^s = \frac{\sum_{k=1}^n W_k^s}{n} + \sqrt{2(\log(n))} \quad \text{(equation 2)}$$

where, W=1, if RSRP of square is locally best; and W=0, otherwise.

Figure 6:
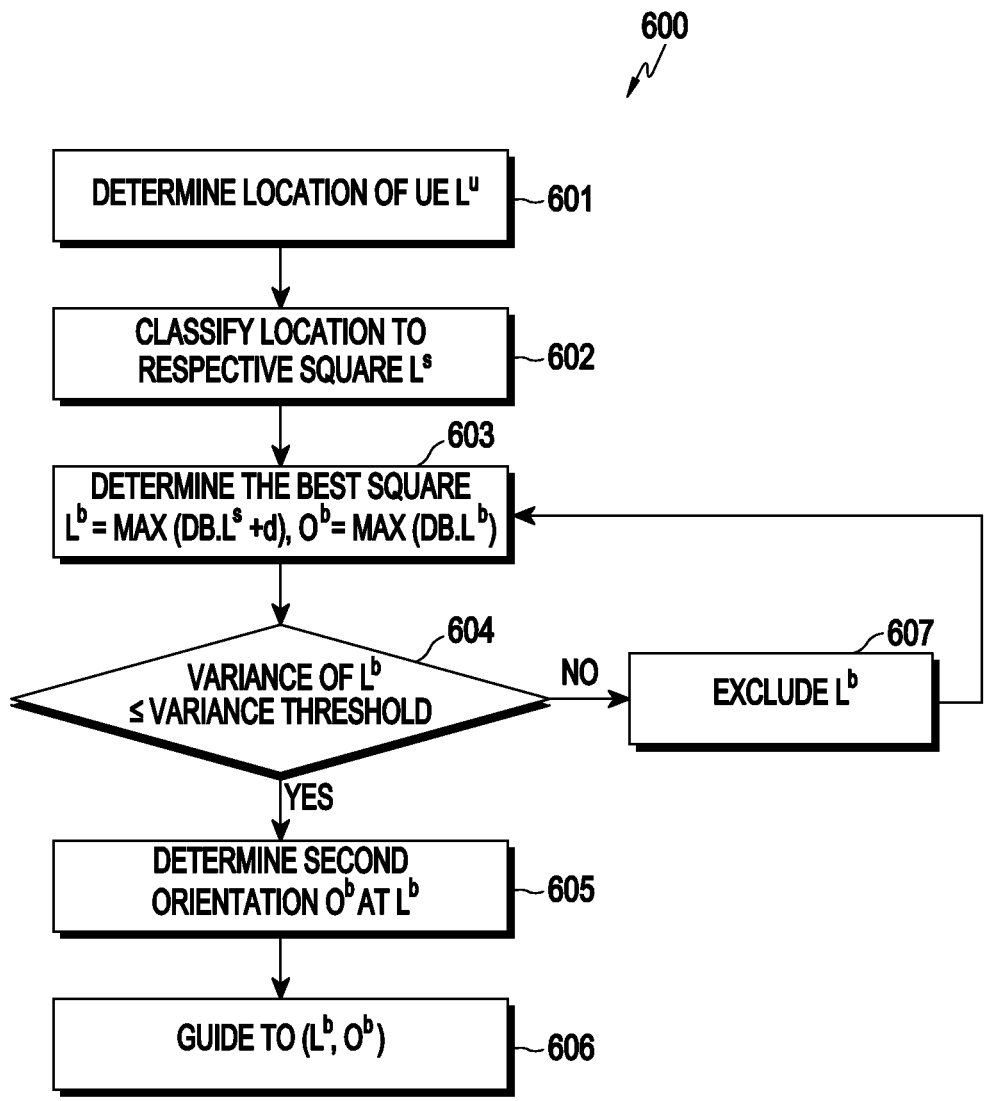
FIG. 6 is a flow diagram illustrating a method of determining a candidate location and the second orientation for providing a better connection to the UE, according to an embodiment as disclosed herein.

FIG. 6 is a flow diagram 600 illustrating a method of determining the candidate location and the second orientation for providing the better connection to the UE (100), according to an embodiment as disclosed herein. In an embodiment, the beam alignment controller (110, 210) performs the steps 601-606. At 601, the method includes determining the location $L^u$ (529) of the UE (100). At 602, the method includes classifying the location $L^u$ (529) to respective small square block $L^s$ (513) in the square block (500). At 603, the method includes determining the best smaller square $L^b$ (507) (e.g., the candidate location) from the eight smaller square blocks (507, 508, 509, 512, 514, 517, 518, 519) using equation 3. The selection of the eight smaller square blocks (507, 508, 509, 512, 514, 517, 518, 519) is dependent on the value of d. For example, when d=1 then the eight smaller square blocks will select. When D=2, then 16 smaller square blocks will select.

<equation 3>

$L^b=\max(DB.L^s+d), O^b=\max(DB.L^b)$ where $L^s$ is the location of the UE (100). $L^b$ is the best location in vicinity of the UE (100). $O^b$ is the best orientation at $L^b$.

At 604, the method includes determining whether the variance of the $L^b$ (507) is smaller than or equal to the variance threshold. At 605, the method includes determining the second orientation for the UE (100) at the $L^b$ (507) upon determining that the variance of the $L^b$ (507) is smaller than or equal to the variance threshold. At 606, the method includes guiding the user to the location corresponds to the $L^b$ (507) and to align the UE (100) to the second orientation $O^b$. At 607, the method includes excluding the smaller square block (507) and performs the step 603 on the remaining smaller square blocks (508, 509, 512, 514, 517, 518, 519) to determine the best smaller square $L^b$.

The various actions, acts, blocks, steps, or the like in the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Figure 7:
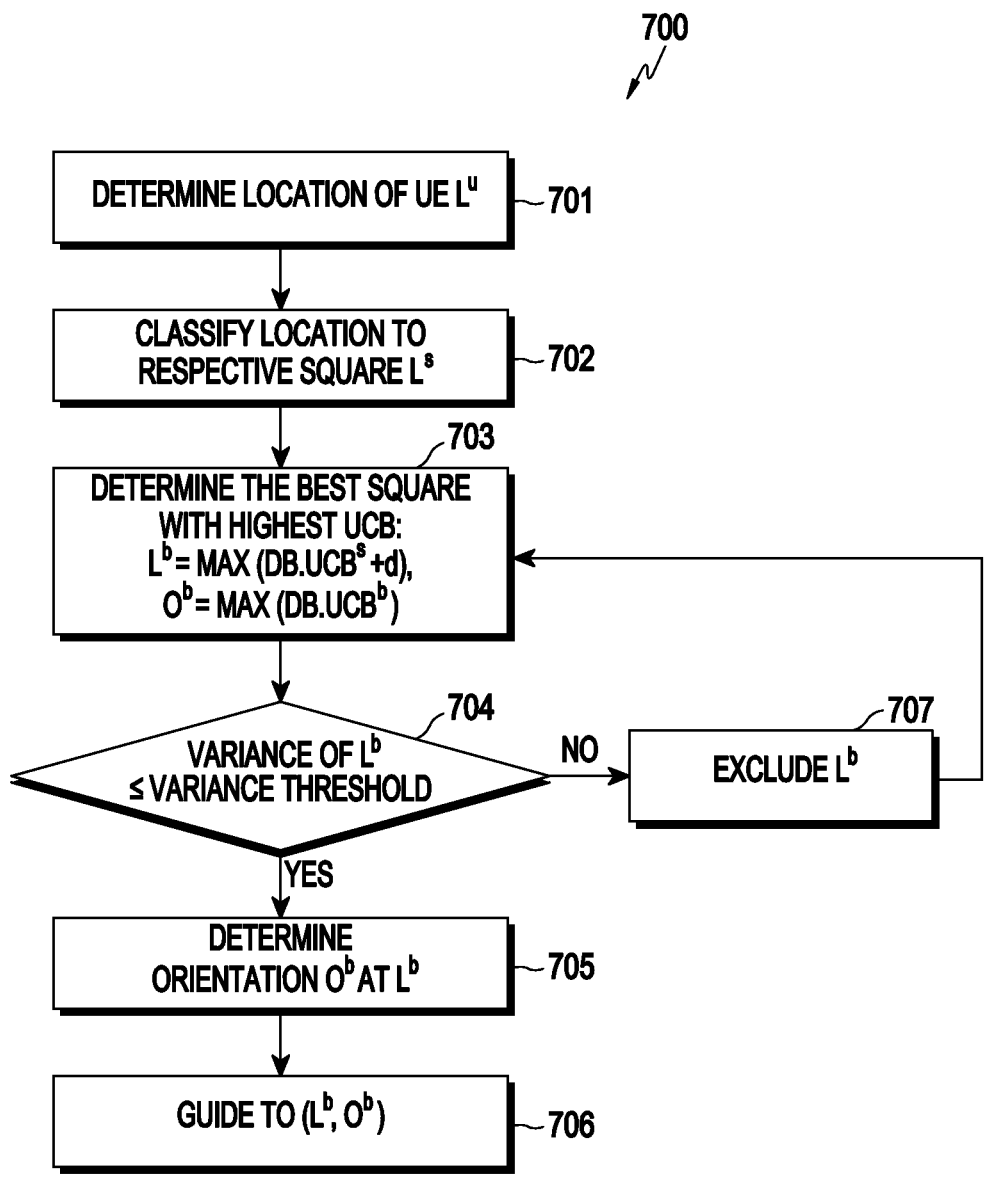
FIG. 7 is a flow diagram illustrating another method of determining the candidate location and the second orientation for providing the better connection to the UE, according to an embodiment as disclosed herein.

FIG. 7 is a flow diagram 700 illustrating another method of determining the candidate location and the second orientation for providing the better connection to the UE (100), according to an embodiment as disclosed herein. In an embodiment, the beam alignment controller (110, 210) performs the steps 701-706. At 701, the method includes determining the location $L^u$ (529) of the UE (100). At 702, the method includes classifying the location $L^u$ (529) to the respective small square block $L^s$ (513) in the square block (500). At 703, the method includes determining the best smaller square $L^b$ (507) (e.g., the candidate location) with a highest UCB from the eight smaller square blocks (507, 508, 509, 512, 514, 517, 518, 519) using equation 4. The selection of the eight smaller square blocks (507, 508, 509, 512, 514, 517, 518, 519) is dependent on the value of d. For example, when d=1 then the eight smaller square blocks will select. When D=2, then 16 smaller square blocks will select.
<Equation 4>

$$L^b=\max(DB.UCB^s+d), O^b=\max(DB.UCB^b)$$

where $UCB^s$ is the UCB at $L^s$. $UCB^b$ is the UCB at $L^b$.

At 704, the method includes determining whether the variance of the $L^b$ (507) is smaller than or equal to the variance threshold. At 705, the method includes determining the second orientation for the UE (100) at the $L^b$ (507) upon determining that the variance of the $L^b$ (507) is smaller than or equal to the variance threshold. At 706, the method includes guiding the user to the location corresponds to the $L^b$ (507) and to align the UE (100) to the second orientation $O^b$. At 707, the method includes excluding the smaller square block (507) and performs the step 703 on the remaining smaller square blocks (508, 509, 512, 514, 517, 518, 519) to determine the best smaller square $L^b$.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

Figure 8:
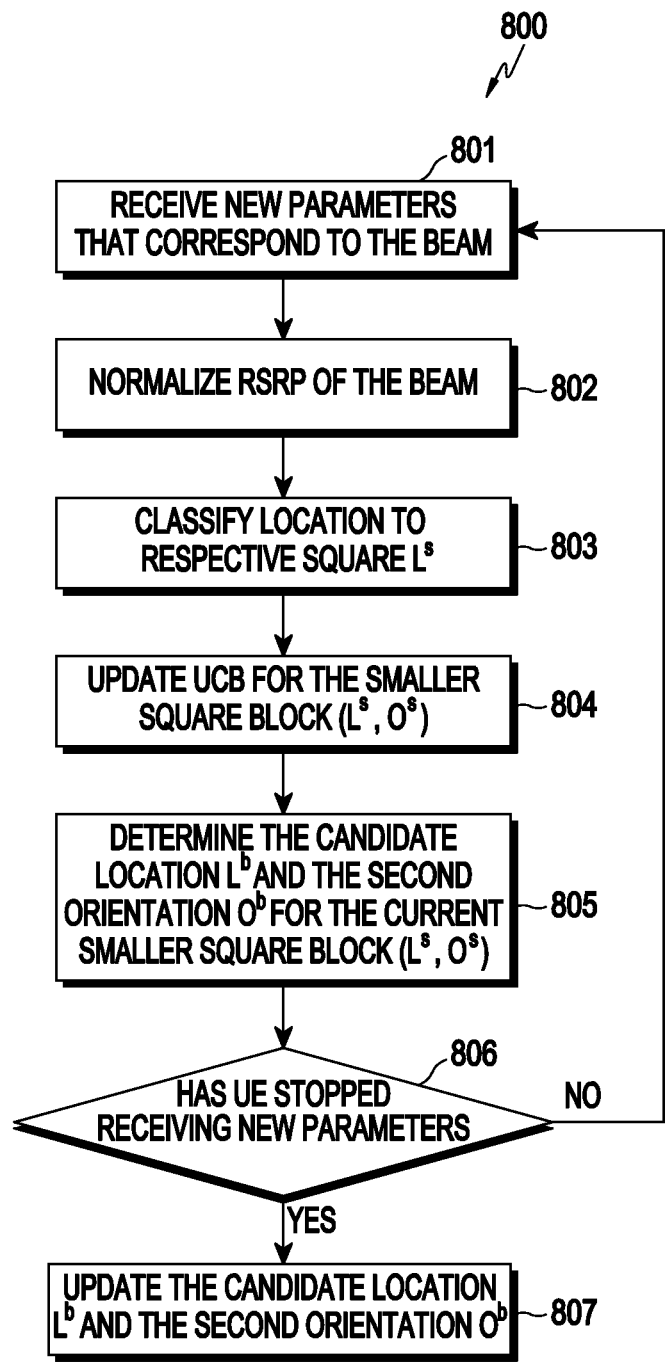
FIG. 8 is a flow diagram illustrating a method of training a ML model for identifying the second orientation, according to an embodiment as disclosed herein.

FIG. 8 is a flow diagram 800 illustrating a method of training the ML model (114, 214) for identifying the second orientation, according to an embodiment as disclosed herein. In an embodiment, the beam alignment controller (110, 210) performs the steps 801-806. At 801, the method includes receiving new parameters corresponds to the beam. At 802, the method includes normalizing the RSRP of the beam in the parameters. At 803, the method includes classifying the location $L^u$ (529) to the respective square $L^s$ (513). At 804, the method includes updating the UCB value for the smaller square block $L^s$ (513) with the orientation $O^s$. At 805, the method includes determining the candidate location $L^b$ and the second orientation $O^b$ for the current smaller square block $L^s$ (513) with the orientation $O^s$. At 806, the method includes determining whether the UE (100) stops receiving the new parameters. At 807, the method includes updating the candidate location $L^b$ and the second orientation $O^b$, in response to determining that the UE (100) stops receiving the new parameters. The method includes performing step 801, in response to determine that the UE (100) does not stop receiving the new parameters.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the invention.

Figure 9A:
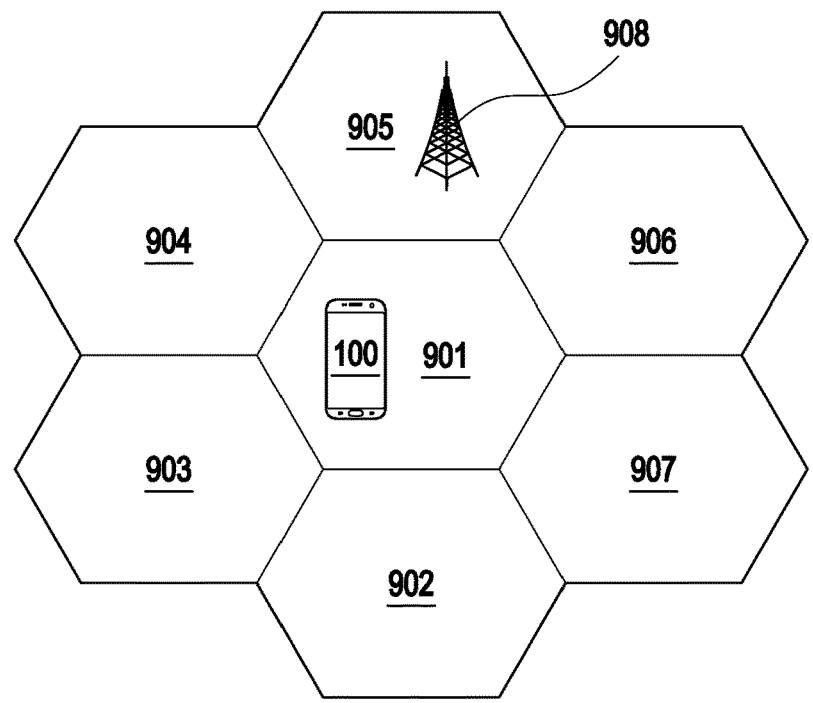
Figure 9B:
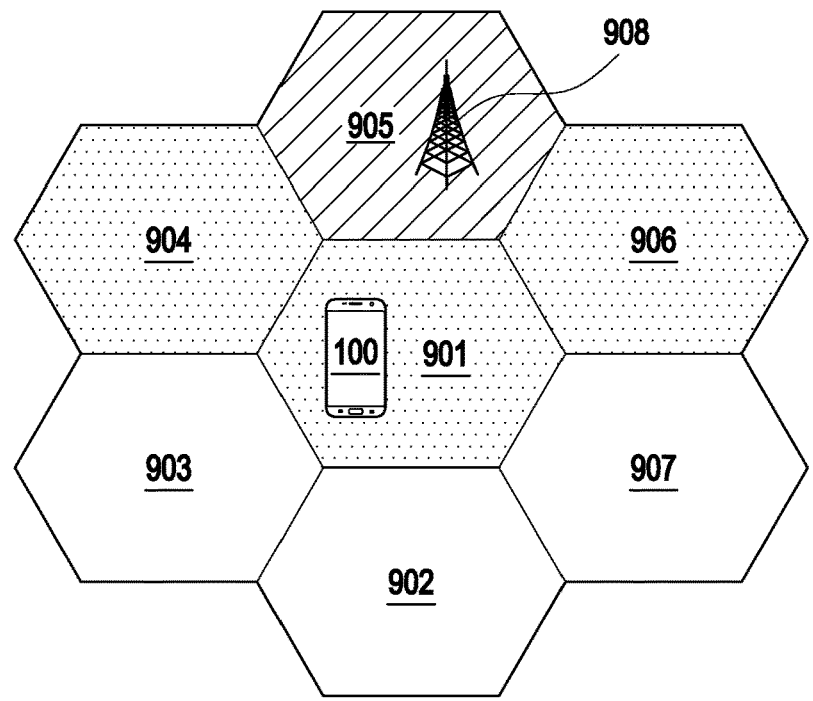

FIGS. 9A-9C illustrate an example scenario of guiding the user to change orientation of the UE (100) from the first orientation to the second orientation, according to an embodiment as disclosed herein. Consider, the user is standing in a location (901) by holding the UE (100) in the first orientation. The UE (100) is connected to a base station (908) in a location (905) as shown in the FIG. 9A. The UE (100) determines the quality of connection at each location (901-907) and each orientation based on the parameters. Further, the UE (100) determines that the location (905) contains the base station (908) as the candidate location with a strongest beam coverage as shown in the FIG. 9B. Further, the UE (100) determines the closest locations (901, 904, 906) to the candidate location has a coverage of the beam with a medium strength. Further, the UE (100) determines the farthest locations (902, 903, 907) to the candidate location has a coverage of the beam with a lowest strength. In response to identifying the candidate location with the strongest beam coverage, the UE (100) determines the second orientation to receive the optimal beam from the base station (908). Further, the UE (100) provides the audio or visual instructions to the user for guiding the user to move from the location (901) to the location (905), and change the orientation of the UE (100) from the first orientation to the second orientation as in the FIG. 9C.

FIGS. 10A-10B illustrate a method of guiding the user to change orientation of the UE (100) from the first orientation to the second orientation, according to an embodiment as disclosed herein. A method of providing the visual instruction to the user for guiding the user to the candidate location and the second orientation is shown in the FIG. 10A. The method allows the UE (100) to display the UX icon such as a compass (1002), where the compass (1002) indicates a direction the user need to follow for the beam alignment. Moreover, the method allows the UE (100) to display an instruction as a text (1001) such as "Move two meters to north" the user needs to follow for the beam alignment. A method of providing the audio instruction to the user for guiding the user to the candidate location and the second orientation is shown in the FIG. 10B. The method allows the UE (100) to generate and play the audio instruction (1004) such as "Move two meters to north" the user needs to follow for the beam alignment.

In an example scenario, the method may be used for placing the CPE at the candidate position and the second orientation, where the CPE is a 5G wireless router being deployed in all mm-wave coverages to route traffic to 5G connected devices.

In another example scenario, the UE (100) includes QTM phasors along edges of the UE (100). Often based on a way the UE (100) is held in the hand of the user, one or more QTM phasors will be blocked by the hand which causes to deteriorate the quality of the connection. Therefore, the UE (100) selects the other QTM phasors not blocked by the hand for the beam alignment, where the QTM phasors are selected using the proposed method. Further, the UE (100) may guide user to change orientation of the UE (100) for the beam alignment using the selected QTM phasors.

In another example scenario, a vehicle (e.g., car) includes the actuator mechanism to hold the UE (100), where a movement of the actuator mechanism is controlled by the UE (100). The UE (100) continually monitors the quality level of the connection between the UE (100) and the network entity. Further, the UE (100) dynamically determines the second orientation of the UE (100) while the vehicle is moving from one location to other location. Further, the UE (100) dynamically controls the actuator mechanism to change the orientation of the UE to the second orientation for the beam alignment. Therefore, the quality level of the connection between the UE (100) and the network entity will be optimal in an entire trip.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of exemplary embodiments, those skilled in the art will recognize that the embodiments herein can be practiced with modification within the scope of the embodiments as described herein.

What is claimed is:

1. A method of performing beam alignment by a user equipment (UE) of a wireless network, comprising:
    determining, by the UE based on a plurality of parameters associated with the UE, a first quality level of a connection of the UE in a first orientation and at a first geographical location, the connection using a first beam from at least one network entity of the wireless network;
    determining, by the UE based on the first quality level, a second geographical location that maximizes a data rate of the UE and is within a predetermined distance threshold from the first geographical location;
    determining, by the UE based on the first quality level, a second orientation from a plurality of orientations at the second geographical location, wherein a second quality level of the second orientation exceeds the first quality level; and
    changing, by the UE, an orientation of the UE from the first orientation to the second orientation, and causing a geographical location of the UE to change from the first geographical location to the second geographical location,
    wherein the determining of the second orientation comprises:
        estimating, by the UE based on the plurality of parameters, for each orientation of the plurality of orientations, a corresponding quality level of the connection at the first geographical location;
        identifying, by the UE and using a machine learning (ML) model, the second orientation based on the corresponding quality level of the connection; and
        determining, by the UE, that the corresponding quality level of the second orientation exceeds the first quality level, and
    wherein the ML model has been trained for identifying the second orientation by:
        receiving one or more parameters corresponding to a particular beam;
        normalizing, based on the one or more parameters, a reference signal received power (RSRP) of the particular beam;
        determining, based on the normalized RSRP, an upper confidence bound (UCB) value for a candidate geographical location corresponding to the at least one network entity and the first orientation of the UE;
        storing the UCB value in a database of the UE; and
        updating, based on stored UCB values, the candidate geographical location having the at least one network entity with a beam and the second orientation.

2. The method of claim 1, further comprising:
    maintaining, by the UE, the connection with the at least one network entity while the orientation of the UE is changed from the first orientation to the second orientation; and
    performing, by the UE, communication with the at least one network entity in the second orientation at the second geographical location.

3. The method of claim 1, wherein the plurality of parameters comprises at least one of a signal-to-noise ratio (SNR) of a beam received from the wireless network, a signal-to-interference-plus-noise ratio (SINR) of the beam, a signal strength, a radio link failure frequency, a width of the beam, a beam identifier (ID), a sector ID, a public land mobile network (PLMN) ID, a physical cell ID, a RSRP of the beam, a reference signal received quality (RSRQ) of the beam, a longitude of the UE, a latitude of the UE, an azimuthal angle of the UE, a polar angle of the UE, and a height of the UE from a ground.

4. The method of claim 1, wherein the UE is connected to the at least one network entity using the first beam or another beam.

5. The method of claim 1, wherein the estimating of the corresponding quality level of the connection comprises:
    monitoring, by the UE based on the plurality of parameters, the corresponding quality level of the connection for each orientation of the plurality of orientations over a period of time;
    identifying, by the UE, geographical locations associated with the plurality of orientations of the UE; and
    storing, by the UE in the database of the UE, information about the corresponding quality level of the connection and the geographical locations associated with the plurality of orientations.

6. The method of claim 5, wherein the information about the corresponding quality level of the connection comprises an UCB value for each of the geographical locations associated with the plurality of orientations of the UE.

7. The method of claim 1, wherein the identifying of the second orientation comprises:
    identifying, by the UE, the first geographical location of the UE that establishes the connection with the at least one network entity in the first orientation;
    determining, by the UE based on information about the first quality level of the connection stored in the database of the UE, the candidate geographical location having one or more network entities with a beam nearest to the geographical location of the UE; and
    determining, by the UE, the second orientation based on the candidate geographical location and the information about the first quality level of the connection.

8. A method of performing beam alignment by a cloud server of a wireless network, comprising:
- receiving, by the cloud server from a user equipment (UE) of the wireless network, a plurality of parameters associated with the UE;
- determining, by the cloud server based on the plurality of parameters, a first quality level of a connection of the UE in a first orientation and at a first geographical location, the connection using a first beam from at least one network entity of the wireless network;
- determining, by the UE based on the first quality level, a second geographical location that maximizes a data rate of the UE and is within a predetermined distance threshold from the first geographical location;
- determining, by the cloud server based on the first quality level, a second orientation from a plurality of orientations at the second geographical location, wherein a second quality level of the second orientation exceeds the first quality level; and
- configuring, by the cloud server, the UE to change an orientation of the UE from the first orientation to the second orientation, and cause a geographical location of the UE to change from the first geographical location to the second geographical location,
- wherein the determining of the second orientation comprises:
  - estimating, by the cloud server based on the plurality of parameters, for each orientation of the plurality of orientations, a corresponding quality level of the connection at the first geographical location;
  - identifying, by the cloud server and using a machine learning (ML) model, the second orientation based on the corresponding quality level of the connection; and
  - determining, by the cloud server, that the corresponding quality level of the second orientation exceeds the first quality level, and
- wherein the ML model has been trained for identifying the second orientation by:
  - receiving one or more parameters corresponding to a particular beam;
  - normalizing, based on the one or more parameters, a reference signal received power (RSRP) of the particular beam;
  - determining, based on the normalized RSRP, an upper confidence bound (UCB) value for a candidate geographical location corresponding to the at least one network entity and the first orientation of the UE;
  - storing the UCB value in a database of the UE; and
  - updating, based on stored UCB values, the candidate geographical location having the at least one network entity with a beam and the second orientation.

9. The method of claim 8, wherein the plurality of parameters comprises at least one of a signal-to-interference-plus-noise ratio (SINR) of a beam received from the wireless network, a signal strength, a radio link failure frequency, a width of the beam, a beam identifier (ID), a sector ID, a public land mobile network (PLMN) ID, a physical cell ID, a RSRP of the beam, a reference signal received quality (RSRQ) of the beam, a longitude of the UE, a latitude of the UE, an azimuthal angle of the UE, a polar angle of the UE, and a height of the UE from a ground.

10. The method of claim 8, wherein the UE is connected to the at least one network entity using the first beam or another beam.

11. An apparatus for performing beam alignment by a user equipment (UE) of a wireless network, comprising:
- a memory storing one or more instructions; and
- at least one processor communicatively coupled to the memory and configured to execute the one or more instructions stored in the memory to:
  - determine, based on a plurality of parameters associated with the UE, a first quality level of a connection of the UE in a first orientation and at a first geographical location, the connection using a first beam from at least one network entity of the wireless network;
  - determine, based on the first quality level, a second geographical location that maximizes a data rate of the UE and is within a predetermined distance threshold from the first geographical location;
  - determine, based on the first quality level, a second orientation from a plurality of orientations at the second geographical location, wherein a second quality level of the second orientation exceeds the first quality level; and
  - change an orientation of the UE from the first orientation to the second orientation, and cause a geographical location of the UE to change from the first geographical location to the second geographical location,
- wherein the at least one processor is further configured to:
  - estimate, based on the plurality of parameters, for each orientation of the plurality of orientations, a corresponding quality level of the connection at the first geographical location;
  - identify, using a machine learning (ML) model, the second orientation based on the corresponding quality level of the connection; and
  - determine that the corresponding quality level of the second orientation exceeds the first quality level, and
- wherein the ML model has been trained for identifying the second orientation by:
  - receiving one or more parameters corresponding to a particular beam;
  - normalizing, based on the one or more parameters, a reference signal received power (RSRP) of the particular beam;
  - determining, based on the normalized RSRP, an upper confidence bound (UCB value for a candidate geographical location corresponding to the at least one network entity and the first orientation of the UE;
  - storing the UCB value in a database of the UE; and
  - updating, based on stored UCB values, the candidate geographical location having the at least one network entity with a beam and the second orientation.

12. The apparatus of claim 11, wherein the at least one processor is further configured to:
- maintain the connection with the at least one network entity while the orientation of the UE is changed from the first orientation to the second orientation; and
- perform communications with the at least one network entity in the second orientation at the second geographical location.

13. The apparatus of claim 11, wherein the at least one processor is further configured to:
- monitor, based on the plurality of parameters, the corresponding quality level of the connection for each orientation of the plurality of orientations over a period of time;
- identify geographical locations associated with the plurality of orientations of the UE; and store, in the database of the UE, information about the corresponding quality level of the connection and the geographical locations associated with the plurality of orientations.

14. An apparatus for performing beam alignment by a cloud server of a wireless network, comprising:

a memory storing one or more instructions; and at least one processor communicatively coupled to the memory and configured to execute the one or more instructions stored in the memory to:

receive, from a user equipment (UE) of the wireless network, a plurality of parameters associated with the UE;

determine, based on the plurality of parameters, a first quality level of a connection of the UE in a first orientation and at a first geographical location, the connection using a first beam from at least one network entity of the wireless network;

determine, based on the first quality level, a second geographical location that maximizes a data rate of the UE and is within a predetermined distance threshold from the first geographical location;

determine, based on the first quality level, a second orientation from a plurality of orientations at the second geographical location, wherein a second quality level of the second orientation exceeds the first quality level; and configure the UE to change an orientation of the UE from the first orientation to the second orientation, and cause a geographical location of the UE to change from the first geographical location to the second geographical location, wherein the at least one processor is further configured to:

estimate, based on the plurality of parameters, for each orientation of the plurality of orientations, a corresponding quality level of the connection at the geographical location;

identify, using a machine learning (ML) model, the second orientation based on the corresponding quality level of the connection; and determine that the corresponding quality level of the second orientation exceeds the first quality level, and wherein the ML model has been trained for identifying the second orientation by:

receiving one or more parameters corresponding to a particular beam;

normalizing, based on the one or more parameters, a reference signal received power (RSRP) of the particular beam;

determining, based on the normalized RSRP, an upper confidence bound (UCB) value for a candidate geographical location corresponding to the at least one network entity and the first orientation of the UE;

storing the UCB value in a database of the UE; and updating, based on stored UCB values, the candidate geographical location having the at least one network entity with a beam and the second orientation.

15. The apparatus of claim 14, wherein the plurality of parameters comprises at least one of a signal-to-noise ratio (SNR) of a beam received from the wireless network, signal-to-interference-plus-noise ratio (SINR) of the beam, a signal strength, a radio link failure frequency, a width of the beam, a beam identifier (ID), a sector ID, a public land mobile network (PLMN) ID, a physical cell ID, a RSRP of the beam, a reference signal received quality (RSRQ) of the beam, a longitude of the UE, a latitude of the UE, an azimuthal angle of the UE, a polar angle of the UE, and a height of the UE from a ground.

* * * * *